(No Model.)
A. INSINGER.
SPOOL OR QUILL WINDING MACHINE.
No. 499,634. Patented June 13, 1893.
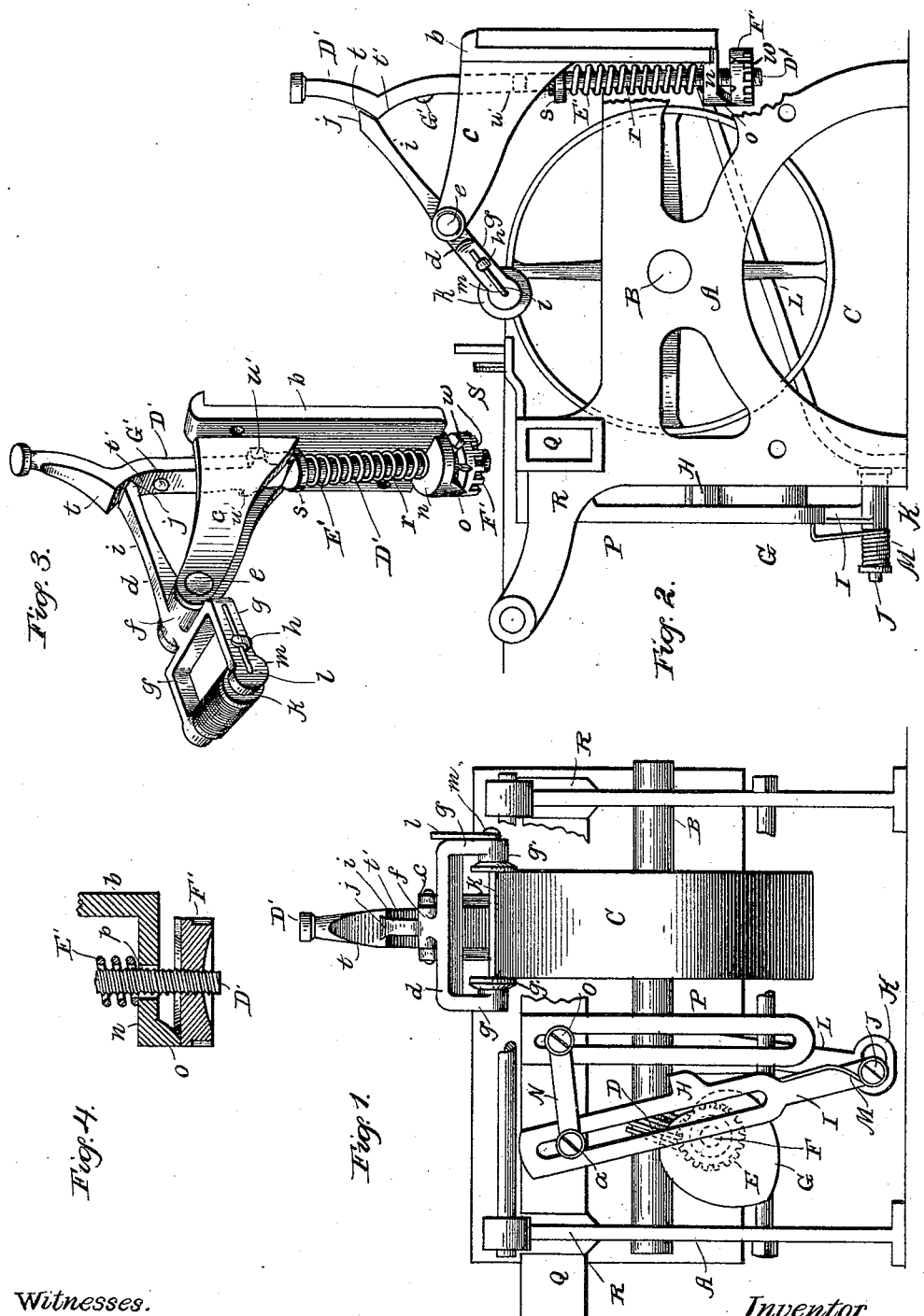
Witnesses.
Victor J. Evans.
P. S. Kenvon.
Inventor.
Alfred Insinger
by W. A. Redmond
Atty.

UNITED STATES PATENT OFFICE.

ALFRED INSINGER, OF PHILADELPHIA, PENNSYLVANIA.

SPOOL OR QUILL WINDING MACHINE.

SPECIFICATION forming part of Letters Patent No. 499,634, dated June 13, 1893.

Application filed September 22, 1892. Serial No. 446,618. (No model.)

*To all whom it may concern:*

Be it known that I, ALFRED INSINGER, a citizen of the United States, residing at Philadelphia, in the county of Philadelphia and State of Pennsylvania, have invented certain new and useful Improvements in Spool or Quill Winding Machines; and I do hereby declare the following to be a full, clear, and exact description of the invention, such as will enable others skilled in the art to which it appertains to make and use the same.

This invention relates, generally, to quill or spool winding machines, and particularly to an improvement in the mechanism for automatically throwing the spool carrying frame out of operative position when the predetermined quantity of thread or silk is wound on the spool or quill, and it has for its object to provide a very simple and comparatively inexpensive device, which is easily and quickly adjusted and which effectually carries out the purpose of the invention, and it consists in the arrangement and combination of parts hereinafter described and pointed out in the claims.

In the accompanying drawings forming a part of this specification—Figure 1 is a front elevation, partly broken away, of a spool winding machine, showing my improvement attached thereto; Fig. 2 an end elevation of the same with a portion of the frame broken away; Fig. 3 an enlarged perspective view of my improved spool carrying frame and its different parts; and Fig. 4 an enlarged detail sectional view.

Similar letters refer to similar parts throughout all the views.

In the drawings I have shown my improvement in position for operation in connection with a quill winding machine of the type described and illustrated in the patent granted June 12, 1888, No. 384,446, to my assignee, William P. Uhlinger, and in which A represents the main frame of the machine, B a shaft suitably supported in the frame and having mounted thereon a wheel C. In this instance I have shown but one wheel C, but it will be understood that any desired number may be mounted on the shaft to correspond to the number of quills or spools that it is desired to wind at one time. At or near one end of the shaft the worm gearing D is arranged so as to engage the teeth of a worm wheel E, as indicated in dotted lines, Fig. 1, mounted on a shaft F arranged in the frame at right angles to the shaft B. On one end of the shaft F is suitably secured a double or heart-shaped cam G which engages a lateral projection H formed on or secured to a lever I pivotally secured at its lower end on a pin J mounted or secured in a slotted projection K formed on the end of a rod L which is supported by and extends from the rear of the frame to the front as best shown in Fig. 2. On the pin J a spiral spring M is secured the free end of which rests against the edge of the lever and thereby holds its lateral projection H in contact with the edge of the cam G. The lever I is slotted longitudinally and a pin or bolt $a$ is adjustably secured therein on which is pivoted one end of a connecting rod N, the other end being pivotally mounted on the end of a pin or bolt O secured in a slotted arm P the upper end of which is attached to a bar Q slidably mounted in guiding slots R formed in the ends of the main frame at its front, so that a reciprocating movement, back and forth, will be imparted to said bar Q when the lever I is moved by the cam, the cam moving the lever I in one direction and the spring M returning it after each forward throw of the cam. The bar Q carries the thread guides S and through its back and forth movement causes the thread to be wound evenly and uniformly on the quills or spools in a manner which is well known.

To the rear wall or back part of the frame of a machine of the construction described or of any other desired or preferred construction embodying a friction wheel for driving the spool and a guiding frame for the thread, I secure a bracket $b$ the arms $c$ of which extend forwardly and over the wheel C, as shown, and between the ends of said arms I pivotally mount the spool carrying frame $d$ by means of a pin $e$ passing through the ends of the arms and through the hub $f$ of the spool frame, whereby said frame may freely turn on the pin.

The spool frame $d$ consists of the parallel arms $g$, having the perforated bosses $g'$ cast thereon, and on one of which a lateral projection is cast which forms a hook $h$, said arms being connected together at their rear ends and to the hub $f$, and of an arm $i$ having its outer or free end beveled off at its upper and lower sides, as at $j$, said arms $g$, hub $f$ and arm $i$ being all cast in one piece. Between the bosses $g'$ of the ends of the arms $g$ the spool $k$ is mounted and pivotally or revolubly secured by a pin $l$ passing through the ends of the arms $g$ and through the spool $k$, one end of said pin being bent at right angles, as at $m$, for the purpose of engaging the hook $h$ and thus retaining the same and the spool in operative position in the spool frame during the winding of the thread on the spool. This construction and arrangement of the pin enable me to easily and readily remove a filled spool from the frame and to place an empty spool therein. At the lower end of the bracket $b$ is cast a horizontally projecting shelf $n$ formed with a perforation $p$ and having a downwardly extending V-shaped lug $o$ cast at its front edge. D' represents a rod the lower portion $r$ of which is round and screw-threaded at its end, and formed with a collar $s$. The upper half of the rod is flat on its front face and has formed thereon the inclined bearing surfaces $t\ t'$, one above the other at its upper end against the upper one of which the end of the arm $i$ bears when the parts are in operative position as best shown in Fig. 2. A spiral spring E' surrounds the lower half of the rod with one end bearing on the upper surface of the shelf $n$ and its other on the lower face of collar $s$ of the rod which is passed through the perforation in the shelf from above, said perforation being of greater diameter than the rod in order to allow the latter limited play therein. On the lower end of the rod a nut F' is secured, said nut having notches in its lower edge to permit of the easy adjustment of the same by hand to adjust the rod vertically and said nut is also formed with V-shaped notches $w$ at its upper edge adapted to engage the lug $o$ of shelf $n$ and thus tilt the rod forward and hold the upper end of the same in yielding contact with the end of arm $i$ of the spool frame. A stop G' is formed on the front face of the rod D' to limit the downward throw of the arm $i$, and in order to prevent the wabbling or lateral play of the rod between the bracket arms $c$ lugs or projections $u'$ are formed thereon, as indicated by dotted lines Figs. 2 and 3 which accomplish the object with the least possible frictional contact between the arms and the rod.

The operation is as follows: An empty spool or quill is secured between the bosses $g'$ of the arms $g$ of the spool frame by a pin $l$, as described, and the frame lowered until the body of the spool or quill rests on the peripheral surface of the wheel C, with the arm $i$ on the inclined bearing surface $t$ of rod D', the spring E' tilting the same forward and through arm $i$ holding the spool in frictional contact with the periphery of the wheel C. The thread or silk to be wound is led from the source of supply and passed around the guides S and connected to the spool and power applied to shaft B thus rotating the wheel C and, through its frictional contact therewith, the spool or quill $k$ and causes the thread or silk to be wound thereon, the guide bar being reciprocated through its connections with the cam causing the thread to be laid evenly and uniformly on the spool. As the winding progresses the quantity of thread increases on the spool and causes that end of the frame on which it is mounted to gradually rise, depressing the end of arm $i$ thereof and thus forcing the upper end of rod D' back against the forward pressure of its spring E' till the end of the arm $i$ slips off or past the apex or edge of the inclined bearing surfaces $t\ t'$, when the beveled upper end of said arm strikes against the lower inclined surface $t'$ of the rod D' and the forward pressure of the same still further depresses the arm, thus raising the other end of the frame and carrying the filled spool up and away from the wheel C. The rod D' may be adjusted vertically between the arms by means of the nut F' to regulate the distance the end of arm $i$ must travel before passing off the upper inclined bearing surface $t$ and thus rendering it easy to adjust the device so that the spool will be automatically thrown out of contact with the wheel when the desired number of yards of thread is wound thereon.

It will be understood from the above description of my invention that the rod D' is tilted forward owing to the fact that the perforation in the shelf is of greater diameter than the rod, and the lug $o$ bearing against one side only of the nut causes the other side, in answer to the pressure of spring E' on the collar $s$, to rise, thus tilting the rod against the end of arm $i$ and raising the same until stopped by the spool coming in contact with wheel C.

Having thus described my invention, what I claim as new, and desire to secure by Letters Patent, is—

1. In a spool or quill winding machine, the combination, with a wheel, of a pivoted spool carrying frame, having a rearwardly extending bearing arm, a rod having inclined surfaces formed thereon, a spring for tilting said rod surrounding the same, and means for adjusting said rod vertically, substantially as described.

2. In a spool or quill winding machine, the combination, with a wheel, of a pivoted spool carrying frame having a rearwardly extending bearing arm, a spring actuated rod having inclined bearing surfaces formed thereon, a nut for adjusting said rod vertically, and means, against which said nut bears at one side, for tilting said rod forwardly, substantially as described.

3. The combination, with the wheel of a spool or quill winding machine, of a spool carrying frame having a rearwardly extending bearing arm, a rod having inclined bearing surfaces for the end of said arm at one end and screw-threaded at its other end, a spring adapted to hold said rod vertical, a shelf through which said rod passes, and a nut for adjusting said rod, substantially as described.

4. The combination, with the wheel of a spool or quill winding machine, of a spool carrying frame consisting of the parallel arms one of which has a laterally projecting hook, the hub, and the bearing arm all of which are cast in one piece, a pin forming the spool spindle having a bent end adapted to engage said hook, and a yieldingly held rod having bearing surfaces formed thereon for said bearing arm, substantially as described.

5. The combination, with the wheel of a spool or quill winding machine, of a pivoted spool carrying frame having a bearing arm cast therewith, a rod having bearing surfaces adapted to engage said arm, a shelf through which said rod passes formed with a downwardly extending lug, a nut having notches at its peripheral upper edge, and a spring surrounding said rod, substantially as described.

6. The combination, in spool or quill winding machine, of the spool carrying frame having the rearwardly extending bearing arm, a rod having inclined bearing surface and a collar formed thereon, a bracket having a perforated shelf formed with a downwardly extending lug, a nut having notches at its upper edge to engage said lug, and a spring arranged between said collar and shelf, substantially as described.

In testimony whereof I affix my signature in presence of two witnesses.

ALFRED INSINGER.

Witnesses:
ELMER E. KRAUSS,
JOSEPH W. KENWORTHY.